Sept. 17, 1968 A. PIETRUCCI 3,401,701
PROCESS AND MEANS FOR SEPARATING THE PARENCHYMA
FROM LIGNACIOUS PARTS OF VEGETABLE
LEAVES AND IN PARTICULAR TOBACCO
Filed June 13, 1966 7 Sheets-Sheet 1

INVENTOR
André Pietrucci
By
Sparrow and Sparrow
ATTORNEYS

Sept. 17, 1968  A. PIETRUCCI  3,401,701
PROCESS AND MEANS FOR SEPARATING THE PARENCHYMA
FROM LIGNACIOUS PARTS OF VEGETABLE
LEAVES AND IN PARTICULAR TOBACCO
Filed June 13, 1966  7 Sheets-Sheet 2

INVENTOR
André Pietrucci
By
Sparrow and Sparrow
ATTORNEYS

Sept. 17, 1968  A. PIETRUCCI  3,401,701
PROCESS AND MEANS FOR SEPARATING THE PARENCHYMA
FROM LIGNACIOUS PARTS OF VEGETABLE
LEAVES AND IN PARTICULAR TOBACCO
Filed June 13, 1966  7 Sheets-Sheet 3

INVENTOR
André Pietrucci
By
Sparrow and Sparrow
ATTORNEYS

INVENTOR
André Pietrucci
By
Sparrow and Sparrow
ATTORNEYS

United States Patent Office 3,401,701
Patented Sept. 17, 1968

3,401,701
PROCESS AND MEANS FOR SEPARATING THE PARENCHYMA FROM LIGNACIOUS PARTS OF VEGETABLE LEAVES AND IN PARTICULAR TOBACCO
André Pietrucci, Fleury-les-Aubrais, France, assignor to Service d'Exploitation Industrielle des Tabacs et des Allumettes, Paris, France, a French public establishment
Filed June 13, 1966, Ser. No. 557,277
Claims priority, application France, June 11, 1965, 20,448
12 Claims. (Cl. 131—146)

ABSTRACT OF THE DISCLOSURE

Apparatus for comminuting tobacco leaves and for classifying the resulting particles comprises two or more coaxial superimposed cutting units, a feed for supplying leaves axially to the uppermost unit, and a conveyor system for supplying the heavier fraction of the mixture formed in each upper cutting unit to the unit therebelow by advancing such fraction in substantial parallelism with the common axis of the cutting units.

---

This invention concerns a "process and means for separating the parenchyma from lignacious parts of vegetable leaves and in particular tobacco."

The present invention has as its object the provision of an apparatus for separating the parenchyma constituting the tissue from vegetables leaves, of ribs which form their skeleton, and more particularly from the central stems of leaves. The apparatus is particularly suited for treatment of tobacco leaves having lignacious parts which cannot be introduced in that state into the product to be smoked.

There has been described in the patent application Ser. No. 425,032, filed Jan. 12, 1965, an apparatus intended for the continuous cutting of tobacco leaves. This apparatus can produce in a single opertion pieces of parenchyma of suitable dimensions having a negligible proportion of ribs.

The present invention relates to improvements in such apparatus.

The apparatus of the present invention comprises means for cutting tobacco leaves in a rotary member provided with teeth and conveyor means for subsequently collecting the pieces expelled from the rotary member immediately after their expulsion in different groups depending on their size and their weight. The leaves are preferably introduced in an orthogonal direction to the planes described by the teeth in rotation and in this case the expulsion is orthogonal to this direction and includes the whole of the area surrounding the cutting member.

After expulsion, one at least of the groups thus constituted is advanced in the initial direction of feed and is again subjected to a cutting action which may be effected immediately after the expulsion. The pieces subjected to such cutting are preferably those including ribs with attached parenchyma. The groups in which at the outlet from the preceeding cutting station include parenchyma and ribs, or, after repeated cutting in the initial direction of feed are recut until they are completely cleaned.

On the other hand the pieces not expelled at each cutting are directly advanced towards successive cutting stations in the initial direction of feed.

The means described permit of a succession of cutting operations at different levels.

According to the horizontal or vertical position of the axis of the rotating member, the direction of expulsion and the movements of particles toward successive cutting stations are influenced in a variable manner by the effect of gravity. Another force such as that produced by currents of air may modify the effect of gravity.

The particles expelled from a cutting station and not conveyed on to a further cutting station at the following level are gathered and eventually sorted so that the particles containing ribs are reintroduced into the rotating member in the initial direction of feed at a level above or below that of their expulsion or to another level.

The eventual necessary sorting is effected at each level of cutting by currents of air according to the size and the weight of the particles. These currents of air may be connected to common transporters or to a common transporter such as one or several currents of air. The common current of air may surround all of the superimposed cutting members. Each current of air may operate in a predetermined zone of the superimposed cutting members. Each common current of air may influence the travel of particles in a zone determined by the separation chamber or the part of the latter situated beyond the cutting members. The surrounding current of air is susceptible of being divided into streams of air circulating at different velocities.

The current of air gathers in the course of its travel particles which it separates according to their surface area and their weight and gathers new particles which it separates and reunites to the preceding ones and regathers, separates and reunites and so on in the inverse order of successive cuttings.

Means are provided to relieve the separation current first of all of the pieces with ribs, then in a lower part of its passage of the pieces of parenchyma after which it gathers again quantities expelled comprising united parenchyma which it separates and from which it rids itself in the course of a new cycle.

Means are arranged to prevent the transportation of pieces with ribs by a separation current of air driving the parenchyma in the upper zone of the separation chamber. These means are arranged with a view to creating above the level of the whole of the cutting a calm zone of air.

The gyration of the air produced by the rotation of the cutting members may be influenced by different means which tend either to reduce or to increase according to the zone concerned.

The attached drawings illustrate several embodiments of an apparatus which is constructed in accordance with the present invention.

FIG. 1 is a diagrammatic partial view of an apparatus in which tobacco is introduced orthogonally to the planes engendered by the teeth in rotation.

This view shows how there are gathered in different groups 4, 5, 6 for example pieces or particles 3 expelled through openings between the bars or the perforations of a cover or cage 2 in which turns a cutting member or rotor having cutters or teeth mounted on a shaft 1. The shaft 1 may of course be disposed vertically or horizontally or in another position.

Figure 1:
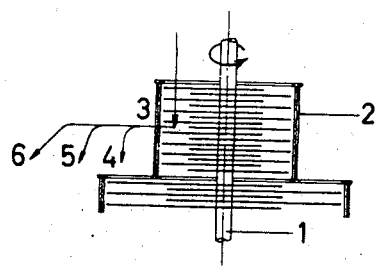
Figure 2:
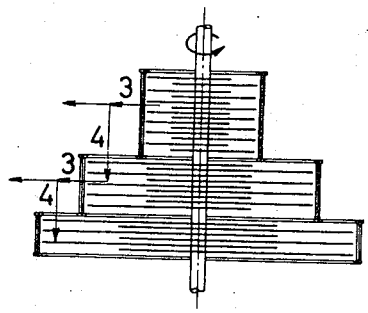
FIG. 2 is a more complete view of the apparatus of FIG. 1 showing how the group 4 of expelled particles 3 is advanced towards a further cutting stage in the initial direction of feed.
Figure 3:
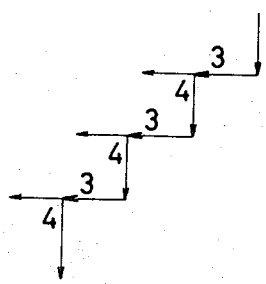
FIG. 3 is a schematic view showing how successive cuttings at different superimposed levels separate the group 4 from the expelled particles 3.
Figure 4:
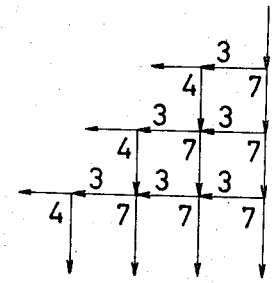
FIG. 4 is another schematic view showing how the particles 7 not expelled at a level of cutting continue their travel in the initial direction of feed.
Figure 5:
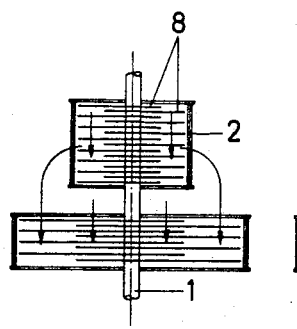

FIG. 5 is a partial view of a composite cutting member or rotor including teeth 8 fixed on the rotating shaft 1, and cages or covers 2 with coaxial openings. The length of the teeth 8 is adapted to the diameter of the covers 2.

The cover 2 at the second level, as considered in the initial direction of feed, has a diameter greater than that of the cover at the first level.

Figure 6:
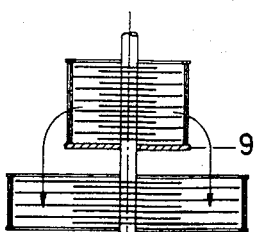

FIG. 6 is a partial view of a cutting member in which the upper level is provided with a base 9 which partitions it from the lower level such that the tobacco entering the lower level belongs to the expelled particles 3.

Figure 7:
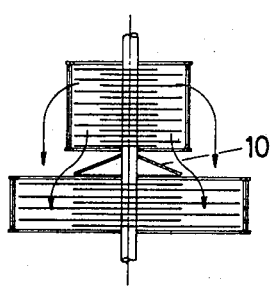

FIG. 7 is a partial view of the cutting member where there is provided between the two levels a deflector 10 defining an outlet from the upper level and an inlet in the lower level directed for the particles of group 7.

Figure 8:
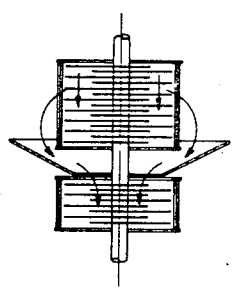

FIG. 8 is another partial view of the cutting member where there is provided between the two levels a collector member determining an inlet directed in the lower level for the particles of the group 4.

Figure 9:
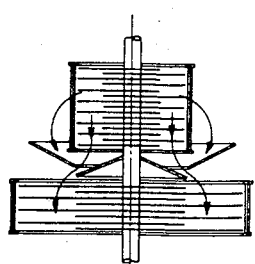

FIG. 9 is another partial view of the cutting member in which the arrangements of FIGS. 7 and 8 have been combined.

Figure 10:
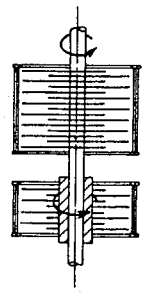
Figure 11:
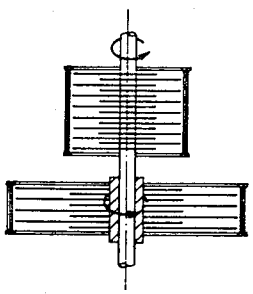

FIGS. 10 and 11 which only differ from one another by the diameters of the cutting levels show a cutting member in which the teeth are fixed on four coaxial shafts turning at different speeds.

Figure 12:
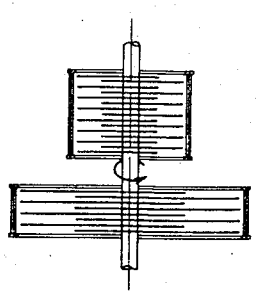

FIG. 12 shows a cutting member in which the teeth are mounted on a single shaft but have different lengths which gives them different linear speeds according to the level considered.

Figure 13:
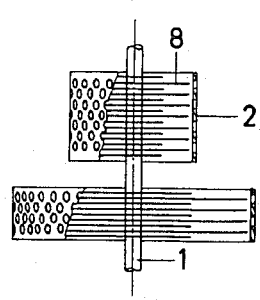

FIG. 13 is a cutting member in which the openings of the cover 2 are perforations.

Figure 14:
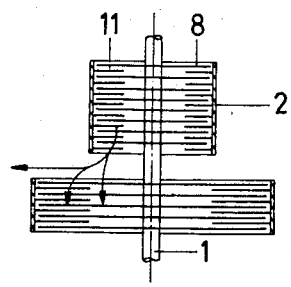

FIG. 14 shows another cutting member in which the cover 2 provided with internal counterpieces 11 are solid and separated by an annular space permitting the expulsion of the particles of the group 3 under the influence of centrifugal or aerodynamic forces.

Figures 15, 17:
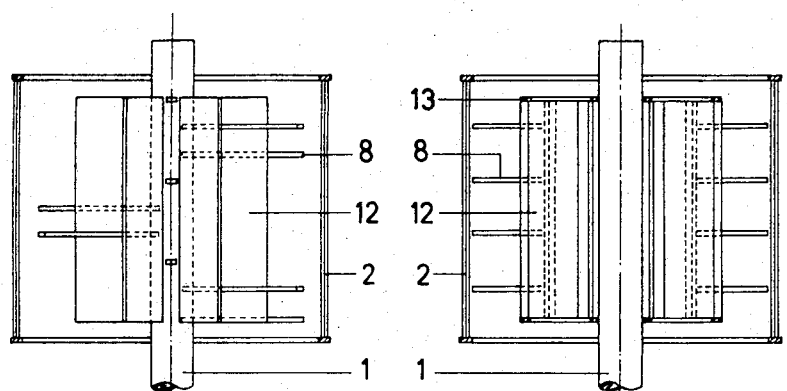
Figures 16, 18:
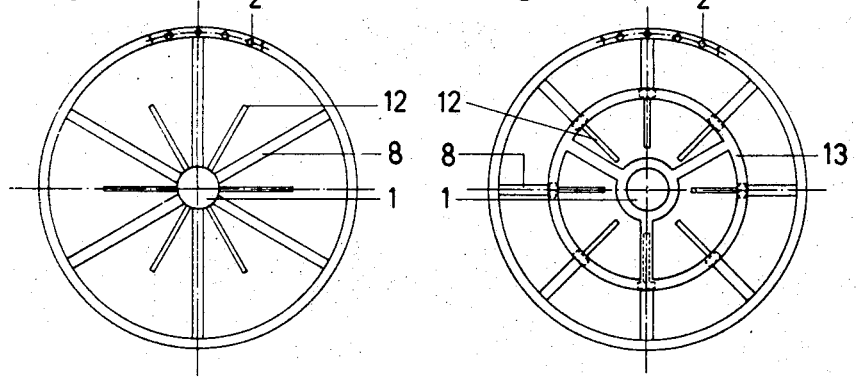

FIGS. 15 and 16 are respectively a partial section and a plan view showing a cutting level including in addition to teeth 8 blades 12 which are fixed to the rotating shaft 1 and are adapted to cause the expulsion of cut particles of tobacco by the creation of aerodynamic forces.

FIGS. 17 and 18 respectively are a partial section and a plan showing another method of constructing a cutting level which consists in providing a cage 13 integral with the rotating shaft and having teeth 8 fixed outside and blades 12 fixed inside.

Figure 19:
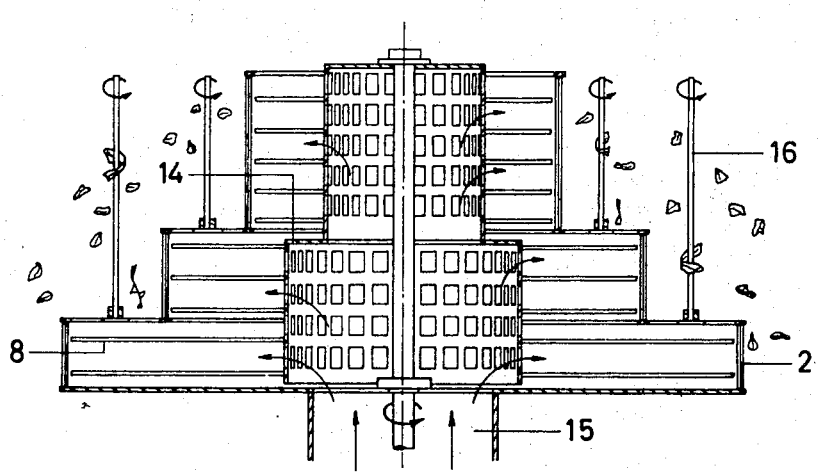

FIG. 19 shows several cutting levels in which a drum 14 having teeth 8 is provided with numerous perforations and communicates with its base and with a conduit 15 for blowing large quantities of air. FIG. 19 also shows a method for collecting, again in various groups, the particles from the various cutting levels. For this purpose, rods 16 which may be fixed or rotatable on their own axes are disposed around the covers 2 at distances from the shaft 1 dictated by the diameters of two successive covers.

Figure 20:
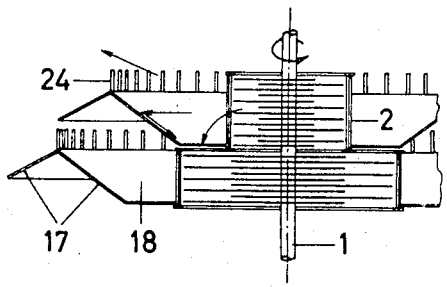

FIG. 20 is a partial view of two levels of cutting having around each of them partitions 17 which define annular spaces 18 arranged for gathering and separating the expelled particles according to their surface area and their weight. Bars are provided to form a barrier arranged partly to stop the particles of tobacco still attached to ribs and thus compel them to return to the cutting member.

Figure 21:
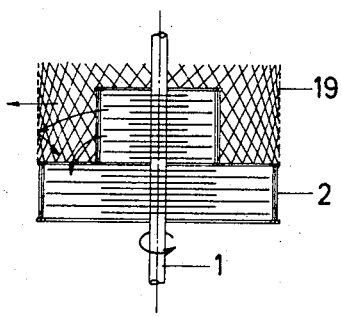
Figure 22:
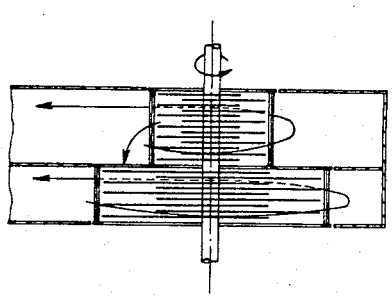

According to FIG. 21, annular spaces 18 are defined by partitions 19. According to FIG. 22, currents of air transport at each level cut particles of tobacco expelled at that level.

Figure 23:
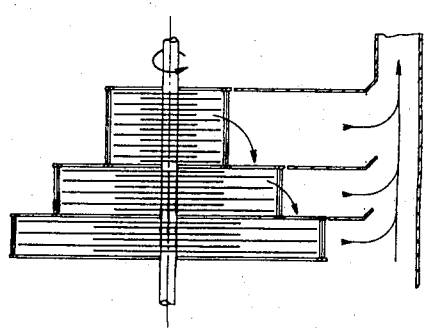

FIG. 23 shows how several currents of air can be reunited into a common current.

Figure 24:
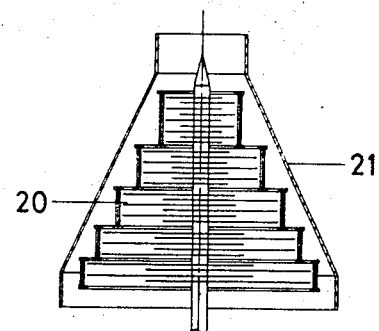

FIG. 24 shows a cutting assembly 20 shaped generally in the form of a cone and having five superimposed stripping means disposed in a suction chamber or hood 21.

Figure 25:
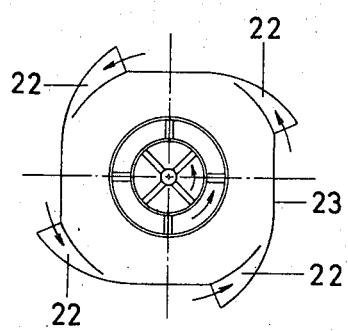

FIG. 25 is a view in perpendicular section in which there is provision to dispose bore tubes 22 around the cutting assembly 20, the said tubes 22 being capable of being supported by partitions 23. These tubes are directed so as to create a gyratory current of air.

Figure 26:
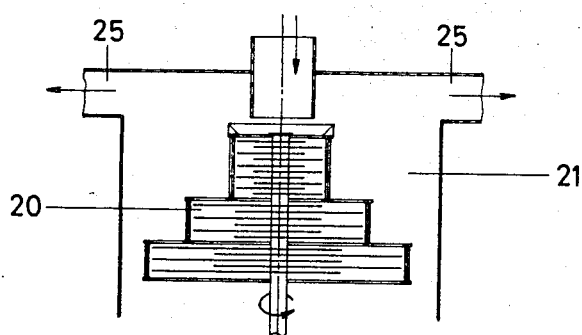

FIG. 26 shows a cutting assembly 20 disposed in a separation chamber 21 having in its upper region two or more lateral suction conduits 25.

Figure 27:
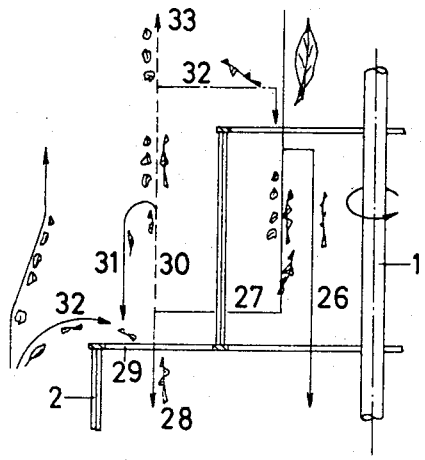

FIG. 27 is a schematic view illustrating the movements of particles of tobacco, expelled and not expelled, at a cutting level. It can be seen that the particles admitted into this level form after cutting, two groups. One group 26 constitutes essentially almost cleaned ribs which continue their journey in the initial direction of feed to arrive directly at the following cutting level.

The group 27 is expelled orthogonally to the initial direction of feed. Immediately after its expulsion the group 27 is divided into two streams, one 28 constituted by the most dense elements of smallest surface area takes up again the initial feed direction towards the opening 29 of the following cutting level, the other, 30, takes a substantially opposite direction. In the course of its travel, the stream 30 is divided itself into three parts, a stream 31 constituted by the densest elements of the stream 30 urged by different forces takes up again rapidly the initial direction of feed. The remainder of the stream 30 which is constituted essentially by pieces of parenchymous ribs and a small part of ribs connected to large pieces of parenchyma forms two streams one of which 32 comprising ribs is directed towards the feed opening of the cutting level considered or towards the feed opening of a level above whilst the other, 33, comprising parenchyma only is removed from the cutting station.

Figure 28:
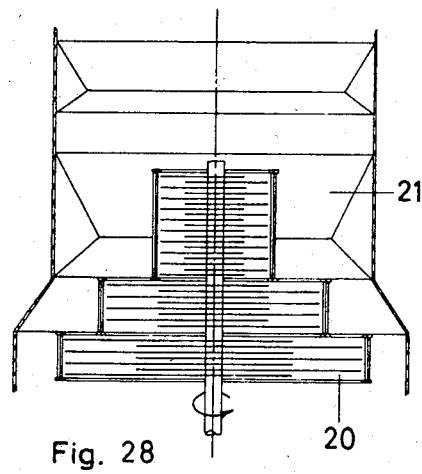
Figure 29:
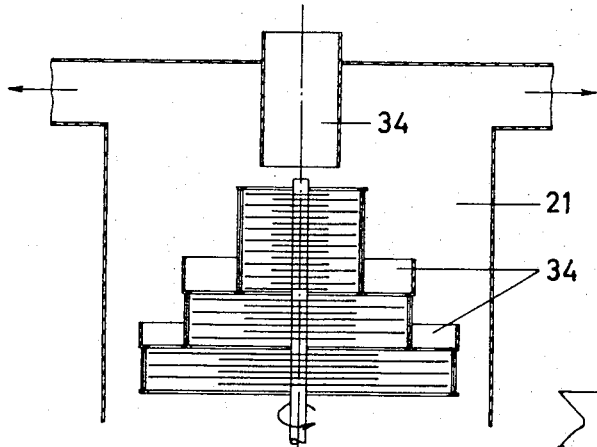

FIG. 28 shows how the various diameters of the separation chamber are arranged with regard to each cutting level to cause the particles of tobacco containing ribs to be driven into the stream 30 in a direction counter to the initial direction of feed to submit them to a fresh cutting action. FIG. 29 shows the different feed conduits 34 of the various cutting levels disposed so as to protect the particles driven to the cutting from the separation current of air.

Figures 30, 31:
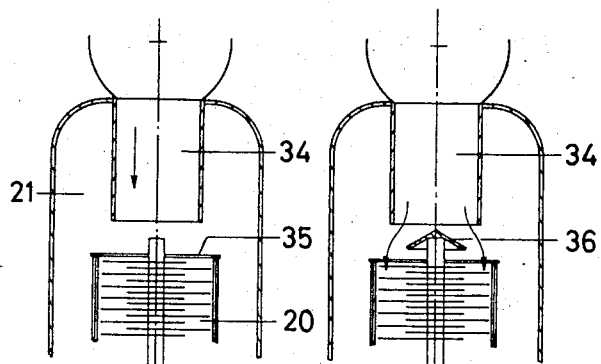

FIG. 30 shows the upper part of the separation chamber which comprises at its centre a main feed conduit 34 which discharges adjacent an upper opening 35 of the cutting assembly 20.

Figure 32:
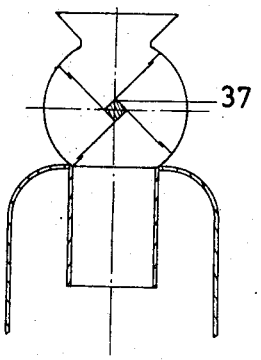

As shown in FIG. 31, the main conduit 34 leads onto a distribution member 36. The main conduit may include an air filter 37 as indicated in FIG. 32.

Figures 33, 34:
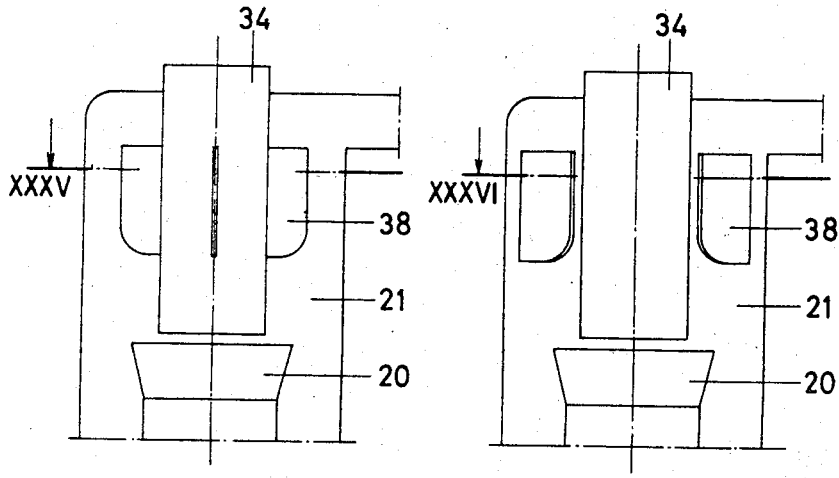

FIGS. 33 and 34 shows sectors 38 disposed radially in the upper region of the separation chamber and fixed either on the outer wall of the main feed conduit 34 or on the inner wall of the cover 21 of the separation chamber.

Figures 35, 36:
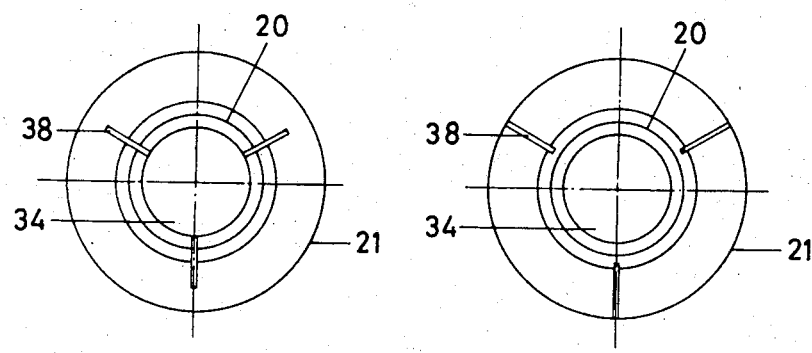

FIGS. 35 and 36 are corresponding cross-sections as viewed respectively from the lines XXXV and XXXVI of FIGS. 33 and 34.

Figures 37, 38:
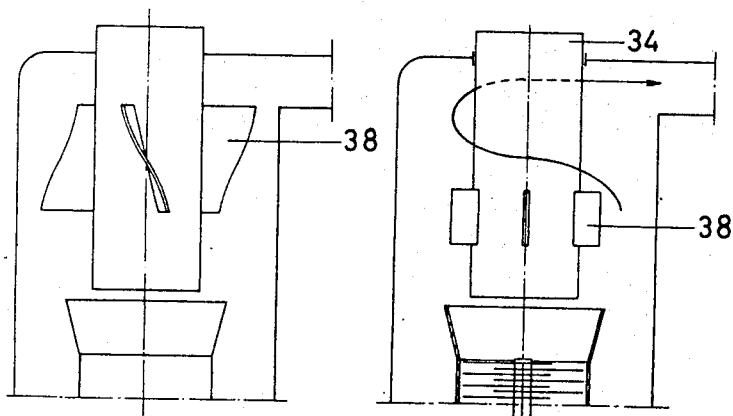

As shown in the arrangement of FIG. 37, deflector blades 38 are provided, these blades being inclined to the axis of the apparatus.

As shown in FIG. 38, the main feed conduit 34 may rotate about its axis.

Figure 39:
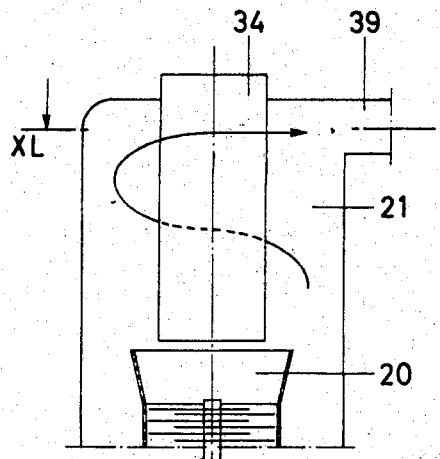
Figure 40:
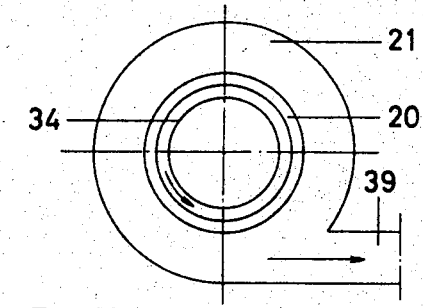

FIG. 39 and its cross-section, FIG. 40, show the tangential air system through the conduit 39 in which the parenchyma is driven.

Figure 41:
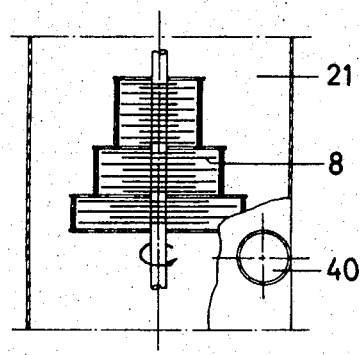
Figure 42:
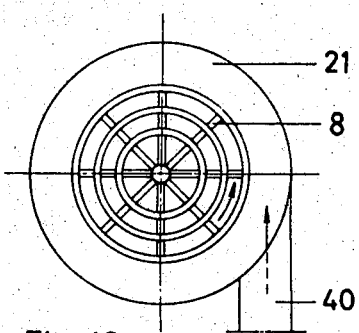

FIG. 41 and its cross-section, FIG. 42, show the tangential introduction of the separation air through the conduit 40.

Figure 43:
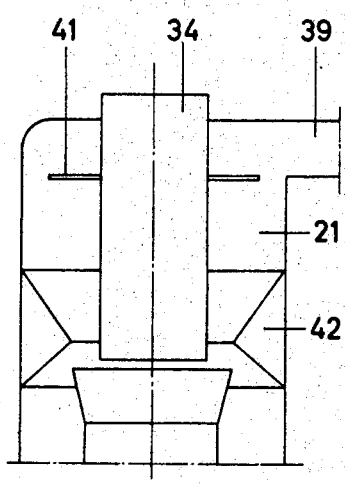

FIG. 43 shows the upper part of the separation chamber and illustrates an arrangement facilitating the falling back of the dense pieces into the first cutting level. This arrangement includes a tapered cone 42 adapted to direct the products to be separated into a zone of the chamber overhung by the circular roof 41 under which the air is calm.

Figure 44:
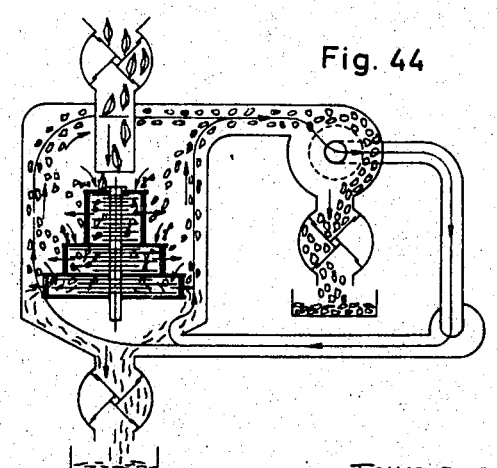

FIG. 44 is a diagram of the apparatus showing a circulation of air in a closed circuit, the feeding for the leaves, the outlet for the ribs or stems and the outlet for the parenchyma or laminae being provided with air locks.

I claim:
1. A method of destalking tobacco leaves, comprising feeding a stream of tobacco leaves substantially downwardly into a stripping zone; subjecting the leaves in said zone to a comminuting action to form a mixture of laminae and particles containing stem; expelling at least said laminae into an area which is located substantially laterally of said stripping zone; circulating along a substantially closed path, a first portion of which includes said area, a current of air at a speed which suffices to entrain laminae from said area; and segregating said current from laminae in a second portion of said path so that air reentering said area is free of laminae.

2. A method of destalking tobacco leaves, comprising feeding a stream of tobacco leaves substantially downwardly into a first stripping zone; subjecting the leaves in said zone to a comminuting action to form a first mixture of pure laminae and particles containing stem and laminae; expelling said mixture into a first area located substantially laterally of said first zone and feeding said particles substantially downwardly into a second stripping zone; and subjecting said particles to a second stripping action to form a second mixture containing laminae and stem; expelling at least the laminae of said second mixture into a second area located substantially laterally of said second zone; conveying across said areas currents of air at a speed which suffices to entrain said laminae; segregating said currents from laminae; and recirculating at least a portion of each air current to said areas.

3. A method as defined in claim 2, wherein said currents form part of a single air current circulating along a substantially closed path a first portion of which includes said areas, said segregating step being carried out in a second portion of said path so that the thus segregated air is free of laminae on reentry into said areas.

4. A method as defined in claim 2, wherein said air currents are sucked from said areas and are thereupon united into a single air current prior to segregation from laminae.

5. A method as defined in claim 2, wherein said areas are contiguous.

6. Apparatus for destalking tobacco leaves, comprising a feed for supplying a stream of tobacco leaves downwardly; stripping means comprising a cage arranged to receive tobacco leaves from said feed and rotor means turnable in said cage to comminute the leaves and to form a mixture of laminae and particles containing stem; a chamber arranged to receive from said cage at least the laminae of said mixture; pneumatic circulating means for conveying through said chamber an ascending current of air which is strong enough to entrain said laminae, said circulating means comprising blower means first conduit means connecting the suction side of said blower means with said chamber, and second conduit means connecting the pressure side of said blower means with said chamber; and means for segregating laminae from air in said first conduit means.

7. Apparatus for destalking tobacco leaves, comprising a feed for supplying a stream of tobacco leaves downwardly; first stripping means comprising a first cage arranged to receive leaves from said feed and a rotor turnable in said cage to comminute the leaves and to form a first mixture of laminae and particles containing laminae and stem; second stripping means comprising a second cage arranged to receive said particles from said first cage and a rotor arranged to comminute such particles to form a second mixture of laminae and stem, the dimensions of said second cage exceeding the dimensions of said first cage; chamber means arranged to receive laminae from said cages; pneumatic circulating means for conveying through said chamber means air at a speed which suffices to entrain said laminae, said circulating means comprising blower means, first conduit means connected with the suction side of said blower means and with said chamber means to withdraw air and laminae from said chamber means, and second conduit means connecting said chamber means with the pressure side of said blower means; and means for segregating laminae from air in said first conduit means.

8. Apparatus as defined in claim 7, wherein said chamber means comprises a single chamber accommodating at least a portion of each of said stripping means.

9. Apparatus as defined in claim 7, further comprising conduit means for conveying laminae from said stripping means to said chamber means.

10. Apparatus as defined in claim 7, wherein said chamber means comprises a separate chamber for each of said stripping means.

11. Apparatus as defined in claim 7, further comprising conduit means for conveying laminae from all of said stripping means to said chamber means.

12. Apparatus as defined in claim 7, wherein said second cage is located at a level below said first cage and wherein at least one of said cages is closed from below.

References Cited

UNITED STATES PATENTS

| 1,024,832 | 4/1912 | Cox | 241—51 |
| 1,977,771 | 10/1934 | McMahan | 131—146X |
| 2,003,141 | 5/1935 | Dorfan | 209—150 |
| 2,050,765 | 8/1936 | Rundell | 131—146X |
| 2,474,314 | 6/1949 | Koehne | 241—51X |
| 3,046,998 | 7/1962 | Mortimer | 131—146 |
| 3,229,698 | 1/1966 | Johansson et al. | 131—146 |
| 3,310,059 | 3/1967 | Grinzinger | 131—146 |

FOREIGN PATENTS

| 1,390,341 | 1/1965 | France. |

ALDRICH F. MEDBERY, *Primary Examiner.*